United States Patent [19]

Everett

[11] 4,366,267

[45] Dec. 28, 1982

[54] CATALYSTS AND BINDER SYSTEMS FOR MANUFACTURING SAND SHAPES

[75] Inventor: George S. Everett, Clarendon Hills, Ill.

[73] Assignee: The Quaker Oats Company, Chicago, Ill.

[21] Appl. No.: 217,451

[22] Filed: Dec. 17, 1980

[51] Int. Cl.³ .......................... C08G 2/30; C08G 4/00
[52] U.S. Cl. .................................... 523/144; 252/441;
 252/442; 525/161; 525/371; 525/398; 525/509;
 526/270; 528/242; 528/249; 528/259
[58] Field of Search ............... 525/371, 161, 398, 509;
 252/442, 441; 526/270; 528/242, 249, 259;
 523/144

[56] References Cited

U.S. PATENT DOCUMENTS

| | | | |
|---|---|---|---|
| 3,748,317 | 7/1973 | Oswitch et al. | 525/371 |
| 4,178,429 | 12/1979 | Scheffer | 525/398 |
| 4,243,780 | 1/1981 | Kruglikov | 525/161 |

*Primary Examiner*—William F. Hamrock
*Attorney, Agent, or Firm*—Neuman, Williams, Anderson & Olson

[57] ABSTRACT

Aluminum perchlorate, cupric perchlorate and chromic perchlorate are used as catalysts for acid catalyzed curable resins.

9 Claims, No Drawings

CATALYSTS AND BINDER SYSTEMS FOR MANUFACTURING SAND SHAPES

The present invention relates to chemical compositions and methods useful in metal founding, and more particularly, to specialty catalysts which are useful in curing so-called "hot box" resin-type binders for core sand and the like used in metal foundries.

The expression "core sand" is used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

In typical foundry practice, core sands of various kinds are formed into sand shapes and set by various methods. Generally speaking, binders for core sand may be subdivided into the so-called "hot box" type of binder and the so-called "no-bake" type of binder. The hot box type binders are generally preferred for certain applications because they are inexpensive, because they produce generally satisfactory results, and because they are well suited to high volume production, particularly production of ordinary iron castings. A typical hot box binder utilizes furan based resins, phenol-formaldehyde resins, often mixed or modified with urea-formaldehyde binders. While cast iron is tolerant of gaseous nitrogen released when the hot metal is poured over a core containing a urea-formaldehyde-containing (UF) binder, certain other metals and alloys are not desirably used with binders of this sort. Accordingly, the low cost potential of phenol-formaldehyde binders modified with UF resins cannot be realized in many applications.

Referring now to certain hot box type binders, while these binders are desirable in many respects, there are recognized drawbacks with these binder systems, and their catalysts, particularly catalyzed binders of the furan type. By "furan type" or "furan-based" binders as used herein is meant those binders which contain derivatives of furan, particularly including furfuryl alcohol, whether used alone or with phenolic resins, UF resins, or mixtures thereof.

In present foundry practice, it is customary to form a core for a casting by filling a heated pattern cavity with a core forming material which comprises core sand mixed with a resin and a catalyst. Desirably, when the core sand material is mixed and placed in the mold, the high temperatures cause rapid curing of the resin, which binds the core sand, making a core which is capable of easy removal from the pattern, which has high strength so as to withstand rough handling, and which is stable so as to permit storage over a long period of time. Moreover, an ideal binder is one which permits the sand to retain so-called high flowability or ease of pattern filling when the sand and the binder are mixed.

In a desirable catalyst and resin system, the resin will not set prematurely, even in the presence of a catalyst, at a given working temperature, but the resin will cure rapidly and completely when a desired threshold temperature is reached or exceeded.

While prior art catalyst and binder systems have functioned satisfactorily in many respects, as the cost of labor and the cost of maintaining production facilities have increased, it has become economically important to mix core sand with binders in larger quantities to increase production and reduce costs. In this respect, prior art curing systems providing relatively short bench lives have either required repetitious work efforts on behalf of the foundry workers mixing the material, or have resulted in waste of chemicals resulting from the need to discard material which was setting up prematurely, i.e., before it could be placed in molds or patterns in which the sand core elements are formed. By "bench life", it is meant the time during which the catalyst may remain mixed with the resin before a substantial portion of the polymerization reaction begins to take place.

To illustrate prior art practices, even though known core binder adhesive systems using known catalysts will commonly have bench lives of from one to four hours, it is preferable that such binders have bench lives equal to at least the length of one working shift, and preferably an hour or more longer than that, i.e., bench lives of eight to twelve or even twenty-four hours.

Accordingly, an ideal catalyst, even though having a protracted bench life, would have a relatively rapid setting time, and would promote thorough curing of the resin throughout the entire sand mix.

Still further, a desirable resin and catalyst system should preferably create low gas evolution when subject to heat, and should impart high tensile strength to the finished core or other sand product made therefrom and used in molding processes.

In the prior art, certain ammonium salt type catalysts have been known to be used in curing furan binder systems, including binder systems modified by the addition of furfuraldehyde or furfuryl alcohol. However, such catalysts, including ammonium chloride and ammonium nitrate, for example, were known to have various drawbacks, including relatively short bench life in relation to that which is commercially acceptable in modern foundry practice. It has generally been considered that for these types of catalysts to be effective, the resin binder must contain at least some free formaldehyde in order to activate the catalyst. This requires that the catalyst solution also contain some urea to keep the formaldehyde released to the environment at a tolerable level.

In view of the shortcomings of the prior art and the need for improved resin binder systems and catalysts for use in such systems, it is an object of the present invention to provide an improved resin binder and catalyst system for use with core sands.

A further object is to provide latent catalysts for use with furan-based binders which will enable the user to save labor by mixing larger quantities of the catalyzed resin and/or resin-treated core sand in a single batch.

Another object is to provide latent catalyst systems which offer good curing characteristics without sacrifice of strength.

Yet another object is to provide a method of curing a resin system and of making sand cores for use in foundry applications.

According to the invention, it has been found that aluminum perchlorate, cupric perchlorate and chromic perchlorate are able to provide highly advantageous resin curing systems, and can therefore be used with great success as catalysts for furan-derived resins used as core sand binder materials.

According to the invention, the aluminum perchlorate, cupric perchlorate or chromic perchlorate catalysts with which the invention is concerned can be mixed with the resin material and sand at room temperature, but will not activate or measurably catalyze the curing reaction for a relatively extended period of time at the working temperatures in question. In foundry practice, such temperatures may range from 50° to 60° F. in the winter to 90° F. or more during the summer. In any case, the temperature of the core sand before application of binder thereto is, in actual practice, generally uncontrolled. However, when the core sand is heated to the temperature at which the core is formed in the mold or pattern, the resin cures rapidly to produce a tough mold core. Inasmuch as such catalysts do not measurably initiate or accelerate the curing reaction at lower temperatures, but do so rapidly at the higher temperatures in question, these catalysts are generally referred to as "latent catalysts".

In keeping with the invention, catalyst performance will be evaluated in terms of the length of time during which the catalyst can remain in association with the resin and the sand without setting up, and this property will be compared with the speed with which substantial curing takes place and with the ultimate tensile strength of the sand shape or core product made by binding the sand with the resin binder.

With prior art resin systems, long bench life of known materials was associated with excessively long cure time at elevated temperatures. Accordingly, it was not generally believed possible to obtain long bench life and quick curing with the same catalysts and catalyzed resin systems. According to the present invention, a good bench life is provided without sacrificing favorable curing time characteristics and ultimate tensile or yield strength in the finished core sand product.

The catalysts with which the invention is concerned are not only able to provide desirable bench life, but, quite surprisingly, display activation temperatures which are quite low in relation to the activation temperatures of prior art latent catalysts. More specifically, the catalysts of the invention have proven effective to make satisfactory mold cores within a short time at temperatures of about 300° F., while most prior art catalysts of the hot box type required initial temperatures of about 425°, for example. Accordingly, the catalysts of the invention may be said to make possible the concept of an intermediate temperature or "warm box" binder system, while the same catalyst is also useful in conventional hot box applications and processes.

In accordance with this invention, the aluminum perchlorate or cupric perchlorate or chromic perchlorate catalysts are used with acid cured resin systems such as furfuryl alcohol polymers, polymers of furfuraldehyde and phenol- and urea-formaldehyde resin systems modified with the addition of furfuryl alcohol or furfuraldehyde to provide improved resin binder systems having good bench life, rapid cure times and high tensile strength. The amount of the catalyst based on the weight of the resin binder is generally from about 2 to 20%, preferably 6 to 10%. The resin binders catalyzed with aluminum perchlorate or cupric perchlorate or chromic perchlorate are used in conventional manner for producing core sand as is well known in the metal founding art. In practice in the art the resin binder is employed generally in amounts of from 0.5 to 5% by weight of sand.

The catalysts of this invention can be applied to the sand followed by application of the resin binder thereto or the catalysts can be admixed with the resin binder and the mixture applied thereto. In keeping with conventional practice, adhesion promoters such as ureido silane compounds can be advantageously used in preparing the binders.

The advantages of the invention will be apparent from the following discussion.

Normally, certain test methods may be used to predict accurately the effectiveness with which a resin system may be used in a foundry environment. These tests will generally indicate whether the material in question will act as an effective latent catalyst, what its performance characteristics in use will be, and how the resin system as a whole will perform. In this connection, the tests may be made to determine what bench life the mixed resin will have, with a long bench life being desirable, assuming the other characteristics of the system are satisfactory. The ultimate strength and uniformity of the final product are also important considerations, as is the time required for the resin to impart a set to the object formed in the sand mold.

One such method includes measuring the so-called dwell-time, which is the length of time the catalyzed resin-and-sand mixture remains in the heated pattern cavity before being removed therefrom for testing purposes. In making tests to determine the desirable characteristics of the present invention, dwell times of 20 and 30 seconds were used. The strength which the sand product possesses is determined by making a so-called "biscuit" or briquette of sand, that is, a formation of sand shaped in a characteristic way (a "dog bone" shape) and bonded by the resin being tested. After the so-called biscuit is formed, it is placed in a machine adapted to determine what the tensile and ultimate yield strengths of the part thus formed are. The shape of a typical briquette or biscuit is well known to those skilled in the art and accordingly, the characteristics thereof are not discussed further herein; for example, however, reference is made to such typical biscuit in a book entitled *Steel Foundry Practice*, by J. H. Hall, (Penton Publishing Co., Cleveland, Ohio, 1950) where such unit is shown and described on page 8.

Data relating to the use of the catalysts of this invention are shown in Table I and Table II below.

TABLE I

| Sand | Binder Composition | % Binder on Sand | Catalyst | % Catalyst/ Resin Binder | Cure Time at 300° F. (Minutes) | Cold Tensile Strength | Scratch Hardness |
|---|---|---|---|---|---|---|---|
| Olivine | FA ®R + 0.2% A1160 Silane* | 2 | 50% AL(CLO$_4$)$_3$ in water | 36 | 15 | 199 | 73 |
| Olivine | FA ®R + 0.2% A1160 Silane* | 2 | 40% HCLO$_4$ in water | 36 | 15 | 124 | 63 |
| Olivine | FA ®R + 0.2% A1160 Silane* | 2 | 50% AL(CLO$_4$)$_3$ in water | 40 | 15 | 206 | 63 |
| Olivine | FA ®R + 0.2% A1160 | 2 | 50% AL(CLO$_4$)$_3$ in water | 20 | 15 | 208 | 78 |

TABLE I-continued

| Sand | Binder Composition | % Binder on Sand | Catalyst | % Catalyst/ Resin Binder | Cure Time at 300° F. (Minutes) | Cold Tensile Strength | Scratch Hardness |
|---|---|---|---|---|---|---|---|
| | Silane* | | | | | | |

*FA®R is a commercial resin binder made by The Quaker Oats Company and comprises 95% furfuryl alcohol monomer and 5% resorcinol. A1160 Silane is a ureido-silane commonly used in foundry binders as an adhesion promoter.

TABLE II

| Sand | Binder | % Binder on Sand | Catalyst | % Catalyst Based on Binder | Bench Life (Hours) | 450° F. Cured Tensile (psi) 20 second cure time | 450° F. Cured Tensile (psi) 30 second cure time |
|---|---|---|---|---|---|---|---|
| Construction Aggregates | FB800* | 1.5 | 50% aluminum perchlorate in water | 20 | 7 | 409 | 342 |
| Construction Aggregates | FB800 | 1.5 | 35% cupric perchlorate in water | 40 | 8 | 286 | 301 |
| Construction Aggregates | FB800 | 1.5 | 38% chromic perchlorate in water | 40 | 7 | 318 | 265 |

*A typical foundry binder composition comprising 70% furfuryl alcohol monomer, 20% urea-formaldehyde syrup (Aerotex 581 sold by American Cyanamid) and 10% of a phenol-formaldehyde novolak resin (Plenco #1617).

It is apparent that the catalysts and binder systems of this invention have wide applicability as binders not only in the metal founding art, but also in analogous applications in which resinous binders are employed such as for the production of carbon articles such as as carbon vanes, reclaimed coke, composite articles such as particle board, fiberglass boards and mats, acoustical tile and the like.

Those modifications and equivalents which fall within the spirit of the invention are to be considered a part thereof.

What is claimed is:

1. A process of curing an acid catalyzed resin which comprises admixing with said resin a catalyst selected from the group consisting of aluminum perchlorate, cupric perchlorate and chromic perchlorate.

2. A process in accordance with claim 1 wherein the catalyst is aluminum perchlorate.

3. A process in accordance with claim 1 wherein the catalyst is cupric perchlorate.

4. A process in accordance with claim 1 wherein the catalyst is chromic perchlorate.

5. A binder composition comprising an acid catalyzed curable resin and a catalyst therefor selected from the group consisting of aluminum perchlorate, cupric perchlorate and chromic perchlorate.

6. A binder composition in accordance with claim 5 wherein the catalyst is aluminum perchlorate.

7. A binder composition in accordance with claim 5 wherein the catalyst is cupric perchlorate.

8. A binder composition in accordance with claim 5 wherein the catalyst is chromic perchlorate.

9. A binder composition in accordance with claim 5 wherein said resin component is a furan-based polymeric resin binder material.

* * * * *